Patented Oct. 12, 1948

2,450,877

UNITED STATES PATENT OFFICE 2,450,877

3-TERTIARY-BUTYL-4-ALKOXY BENZALDEHYDES

Marion Scott Carpenter, Nutley, and William M. Easter, Jr., Lodi, N. J., assignors to Burton T. Bush, Inc., New York, N. Y., a corporation of New Jersey No Drawing. Application May 24, 1947, Serial No. 750,355

7 Claims. (Cl. 260—599)

1

This invention relates to novel aromatic aldehydes and to a process for preparing them. More especially, the present invention relates to 3-tertiary-butyl-4-alkoxy benzaldehydes.

The structural formula of our novel materials may be represented as follows:

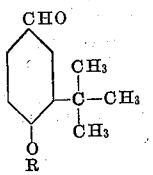

wherein R may be a methyl or ethyl radical. These new aldehydes are colorless, crystalline materials having somewhat empyreumatic odors of the "cuir de Russe" type. They may be employed per se in prefumes and cosmetics, and are of further value as intermediates for the preparation of other new aromatic compounds.

Our novel compounds are prepared by heating a material having the structural formula:

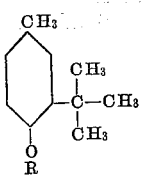

wherein R is a methyl or an ethyl radical, with an oxidation agent such as manganese dioxide in sulfuric acid, at an elevated temperature.

The $CH_3$ group is converted to the CHO group by our process. This is surprising in view of the fact that tars and quinones are formed if similar starting materials not having a $CH_3$ group in the position para to the OR group are employed in the process.

In general, the process is conducted by agitating a mixture of the butylated cresol ether, aqueous sulfuric acid (20–60% $H_2SO_4$ content) and manganese dioxide at a temperature of about 50° to 90° C., for a period of time substantially to dissolve the manganese dioxide. This period may vary from 6 to 30 hours, or more. At the end of the reaction period the organic component is removed and worked up by customary procedures, such as distillation, to isolate the aldehyde.

The following examples are given in order more fully to illustrate this invention, without however limiting the same to them.

2

EXAMPLE I

*Preparation of 3-tertiary-butyl-4-methoxy toluene*

330 liters of iso butylene are passed into an agitated mixture of 1,464 grams p-cresol methyl ether and 75 grams sulfuric acid 93%, at a temperature of 22°–28° C., as rapidly as the absorption of the gas will permit. About three hours is required. The oily reaction mixture is washed with dilute caustic soda solution and then with water until it is neutral and is then distilled in vacuo. There is first obtained 73 grams of unreacted p-cresol methyl ether, boiling at 47° C. under 3 mm. of mercury pressure, followed by 2,105 grams of the desired product boiling at 78° C. under 3 mm. of mercury pressure. This product is a colorless oil having a congealing point of 16° C.

EXAMPLE II

*Preparation of 3-tertiary-butyl-4-methoxy benzaldehyde*

A mixture of 400 grams 3-tertiary-butyl-4-methoxy toluene, 221 grams manganese dioxide and 2,000 grams 30% sulfuric acid is agitated vigorously for 28 hours at a temperature of 62°–65° C. After cooling to room temperature the mixture is filtered to remove a small amount of unreacted manganese dioxide, the presence of which would impede the washing of the oily layer. The lower layer containing manganese sulfate and sulfuric acid is discarded and the upper oily layer is washed to neutrality with water and distilled, preferably in vacuo. There first passes over at 80°–82° C. under a pressure of 3 mm. of mercury about 226 grams of recovered 3-tertiary-butyl-4-methoxy toluene. After an intermediate fraction of about 4 grams there is then collected at 117°–122° C. under the same pressure about 187 grams of 3-tertiary-butyl-4-methoxy benzaldehyde, which rapidly solidifies to a solid mass. After recrystallization from half its weight of naphtha, there is obtained about 170 grams of purified aldehyde. It is a colorless crystalline material melting at 54°–55° C. and having a somewhat empyreumatic odor of the "cuir de Russe" type.

EXAMPLE III

*Preparation of 3-tertiary-butyl-4-ethoxy toluene*

42 liters of isobutylene is passed into an agitated mixture of 204 grams p-cresol ethyl ether and 9 grams sulfuric acid 93%, at a temperature of 22°–28° C., as rapidly as the absorption of the gas will permit. About one hour is required. The oily reaction mixture is washed with dilute caustic soda solution and then with water until it is neutral and is then distilled in vacuo. There is first obtained 44 grams of unreacted p-cresol ethyl ether, boiling at 57° C. under 3 mm. of mercury pressure, followed by 224 grams of 3-tertiary-butyl-4-ethoxy toluene boiling at 84° C. under 3 mm. of mercury pressure. This product is a colorless oil having a mild characteristic odor. It has specific gravity (25° C.) .915 and upon slight cooling congeals to a crystalline mass of melting point 22° C.

EXAMPLE IV

*Preparation of 3-tertiary-butyl-4-ethoxy benzaldehyde*

A mixture of 192 grams 3-tertiary-butyl-4-ethoxy toluene, 100 grams powdered manganese dioxide and 900 grams sulfuric acid 30% is agitated for 28 hours at a temperature of 60°–65° C. The mixture is then cooled to room temperature, thinned with 200 grams benzene and filtered to remove a small amount of unreacted manganese dioxide. The lower layer containing manganese sulphate and sulfuric acid is discarded and the upper layer is washed with dilute sodium carbonate solution and then with water to neutrality, the solvent distilled off and the remainder distilled in vacuo. There is first obtained 104 grams of unreacted 3-tertiary-butyl-4-ethoxy toluene, followed by 63 grams of 3-tertiary-butyl-4-ethoxy benzaldehyde boiling at 133° C. under 3½ mm. of mercury pressure. The aldehyde soon congeals to a solid mass. After recrystallization from half its weight of naphtha, there is obtained 60 grams of pure aldehyde as colorless needles of melting point 69°–70° C. It has an empyreumatic odor quite similar to that of 3-tertiary-butyl-4-methoxy benzaldehyde, but somewhat softer.

The foregoing illustrates the practice of this invention which however is not to be limited thereby but is to be construed as broadly as permissible in view of the prior art and limited solely by the appended claims.

We claim:

1. Compounds having the structural formula:

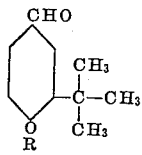

wherein R is selected from the group consisting of $CH_3$ and $C_2H_5$.

2. 3-tertiary-butyl-4-methoxy benzaldehyde.
3. 3-tertiary-butyl-4-ethoxy benzaldehyde.
4. The process for preparing compounds having the structural formula:

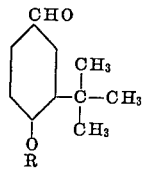

wherein R is selected from the group consisting of $CH_3$ and $C_2H_5$, which comprises reacting a material having the structural formula:

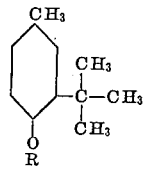

wherein R has the same significance as above, with manganese dioxide in the presence of sulfuric acid at an elevated temperature.

5. The process of claim 4, wherein the temperature employed is within the range of about 50° C. to about 90° C.

6. The process of claim 5, wherein the material treated with the oxidation agent is 3-tertiary-butyl-4-methoxy toluene.

7. The process of claim 5, wherein the material treated with the oxidation agent is 3-tertiary-butyl-4-ethoxy toluene.

MARION SCOTT CARPENTER.
WILLIAM M. EASTER, Jr.

REFERENCES CITED

The following references are of record in the file of this patent:

FOREIGN PATENTS

| Number | Country | Date |
|---|---|---|
| 22,121 | Great Britain | Oct. 27, 1898 |